Sept. 12, 1961  D. R. BLAIR ET AL  2,999,701
PIPE COUPLING HAVING SEALING AND ANCHORING MEANS
Filed April 8, 1959  3 Sheets-Sheet 1
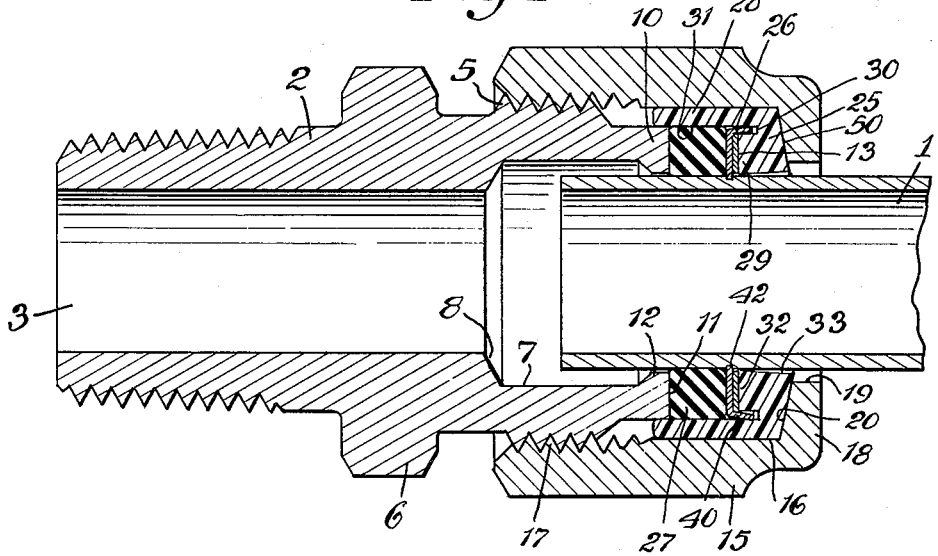
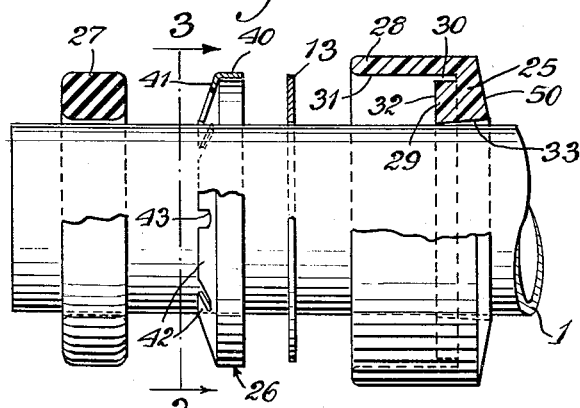
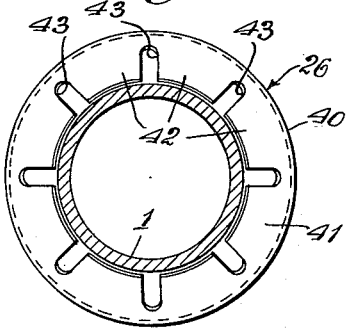
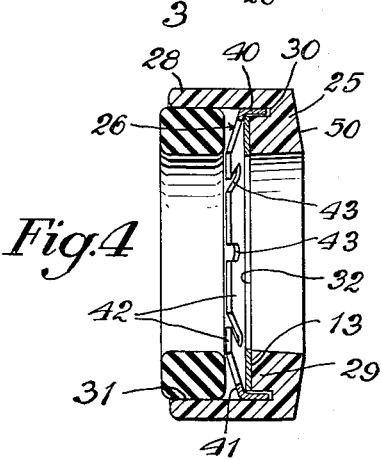
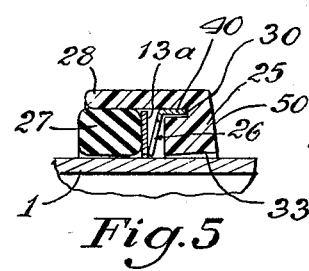
Inventors
David R. Blair
Dibrell P. Hynes
by Parker & Carter
Attorneys

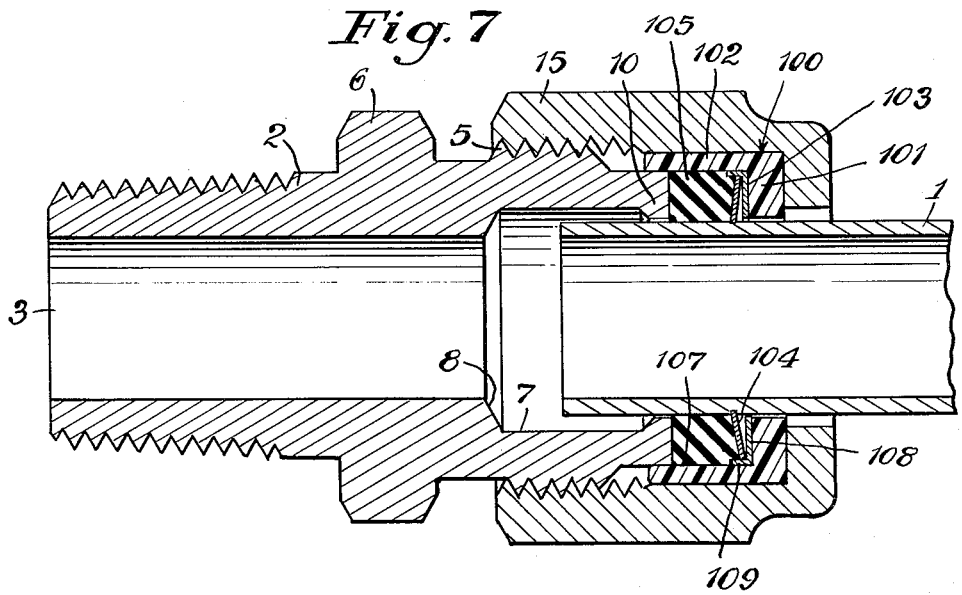
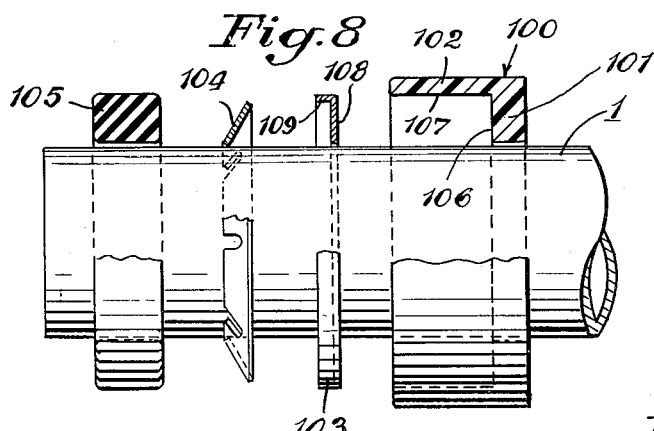
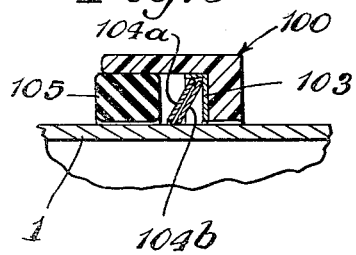

United States Patent Office 2,999,701
Patented Sept. 12, 1961

2,999,701
PIPE COUPLING HAVING SEALING AND ANCHORING MEANS
David R. Blair, Prospect Heights, and Dibrell P. Hynes, Chicago, Ill., assignors to Chicago Forging and Manufacturing Company, Chicago, Ill., a corporation of Delaware
Filed Apr. 8, 1959, Ser. No. 805,033
1 Claim. (Cl. 285—340)

This invention relates to improvements in joints or securing means for tubes. The invention has for one purpose the provision of securing means which can be quickly and easily applied, without the need for special tools.

This is a continuation-in-part of application Serial No. 641,341, filed February 20, 1957, and now abandoned.

Another purpose is to provide a joint which will withstand high pressure.

Another purpose is to provide a joint anchorage means which will be solidly fixed or secured to the exterior surface of a tube.

Another purpose is to provide a securing means wherein provision is made for limitation upon distortion of a securing element thereof, generally referred to as overtorquing.

Another purpose is to provide improved securing means for tubes incorporating means effective to preclude wedging, distortion, and tearing-off of an element thereof.

Another purpose is to provide an anchorage joint capable of maximum sealing against leakage.

Another purpose is to provide a sealed joint which shall resist high pressures and which shall permit long continued use under such high pressures.

Another purpose is to provide a joint anchorage employing a minimum of parts.

Another purpose is to provide, in a packaged unit, an anchorage and seal member.

Another purpose is to provide an anchorage joint wherein a minimum surface of a tube is contacted by the elements thereof and sufficient clearance is provided to permit flexing of the tube without leakage, distortion or breaking of the tube.

Another purpose is to provide a seal unit in which the sealing means is completely contained so as to prevent extrusion thereof.

Another purpose is to provide a seal unit in which two fitting elements form a circumferential channel, said channel being filled, at least in part, by a cushion circumferential wall portion so as to prevent extrusion of the sealing element.

Another purpose is to provide a packaged seal unit and anchorage means therefor of maximum simplicity of manufacture.

Other purposes will appear from time to time during the course of the specification and claim.

The invention is illustrated more or less diagrammatically in the accompanying drawings wherein:

FIGURE 1 is a longitudinal section through the axis of the tube;

FIGURE 2 is a side elevation illustrating some parts of the joint of the tube, with parts broken away and parts in radial section;

FIGURE 3 is a sectional view taken on the line 3—3 of FIGURE 2;

FIGURE 4 is a view in radial cross-section illustrating the packaged unit of the invention;

FIGURE 5 is a detail view in cross-section illustrating a variant arrangement of elements of the invention;

FIGURE 6 is a detail view similar to that of FIGURE 5 and illustrating another variant arrangement of elements of the invention;

FIGURE 7 is a longitudinal section through an axis of the tube and illustrating a variant form of the invention;

FIGURE 8 is a side elevation illustrating some parts of the joint illustrated in FIGURE 7 with parts broken away and parts in radial section;

FIGURE 9 is a detail view in cross-section illustrating a variant form of the invention;

FIGURE 10 is a detail view of another variant form of the invention;

FIGURE 11 is a detail view of still another variant form of the invention.

Figure 12:
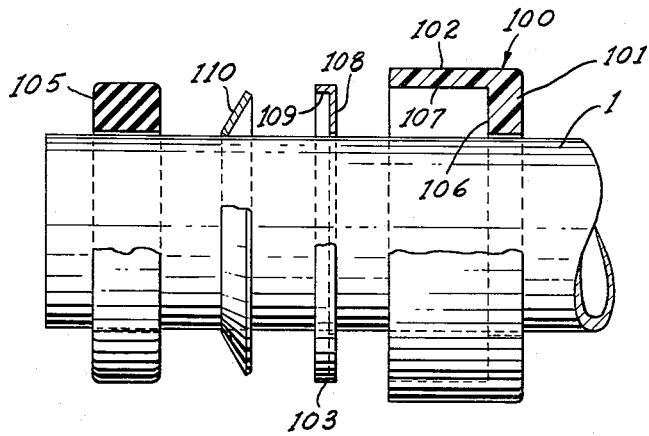
FIGURE 12 is a detail view of another variant form of the invention.

Referring now to the drawings and particularly to FIGURE 1, the numeral 1 indicates the end portion of a tube. A fitting member or element to which the tube end is secured is shown as 2. The element 2 has a center bore 3 and an outwardly screw-threaded tube-receiving portion 5. 6 is an enlargement provided for engagement by any suitable tightening tool. The portion 5 is provided with an enlarged bore 7, connected to the bore 3 by a tapered surface portion 8. The bore 7 is of sufficient diameter to receive the inner end of the tube 1 without metal-to-metal contact. The portion 5 is shown as having an inwardly offset or reduced inner terminal portion 10, the annular end face of which is shown generally at 11. The end surface 11 has its inner circumferential edge defined by an inwardly extending flange 12, the internal diameter of which, while less than that of the bore 7, is nonetheless larger than the external diameter of the tube end 1. The inner diameter of flange 12 is, however, as close to that of tube 1 as will permit ease of mounting of member 3 on tube 1 while at the same time preventing, as described below, extrusion of a seal ring between tube 1 and flange 12. The chamber or bore 7 is large enough to permit flexing or movement of the end of tube 1 therewithin resulting from any angular displacement of tube 1.

A nut or pressure member 15, has an internal, generally cylindrical surface 16, a portion of which is inwardly threaded as at 17 for engagement with the external threads of the above-mentioned portion 5. The end portion 18 of the nut 15 is formed with an aperture or bore 19 through which the tube 1 passes, the diameter of the bore 19 being sufficiently greater than that of the tube 1 to prevent metal-to-metal contact therebetween. The portion 18 has an inner annular surface 20 which may, as shown, be conic.

The members 2 and 15 may, for convenience, be designated, as is clear from the drawings, as chamber elements or chamber-forming elements.

A joint anchorage is formed of a retainer 25, which may also be termed a cushion, an anchor 26, and a seal ring 27. The element 25, which may be formed of metal or nylon or other plastic, comprises a circumferential wall portion 28 and an inwardly extending rear end enlargement 29. An annular or circumferential groove 30 is formed in the inner portion of the enlargement 29 and has its outer wall defined by the inner surface 31 of the wall 28. The numeral 32 designates an inner annular surface of the enlargement 29 and the number 33 indicates an inwardly conical circumferential surface defining a central bore or aperture in the annular enlargement 29. It will be observed that the smallest diameter of the surface 33 is only slightly greater than the outer diameter of tube 1 in order to provide maximum support of anchor 26, the conical configuration of the surface 33 being effective to permit flexing of tube 1.

The anchor member 26 has a circumferential wall portion 40, dimensioned to seat within the groove 30, and, in its free state, member 40 has an annular conical portion 41. The portion 41 may be considered as more or less conic or tapered and, as seen best in FIGURE 3, is split or separated into a series of segments 42 by separating gaps 43. Thus the anchor 26 may include a plurality of teeth or gripping segments 42. It will be understood that the anchor 26 may be made in various forms. For example, a plurality of sharp teeth may be substituted for the segments 42 without departing from the nature and scope of the invention.

A reinforcing or back-up ring is indicated at 13 in FIGURES 1 and 2. A similar distortion-limiting and pressure or back-up ring 13a is shown in another position in FIGURE 5, the ring 13a having an outer diameter greater than that of member 13.

The washer or seal member 27 may comprise a ring, the material of which, while somewhat compressible, is formed relatively stiff or resistant and may, for example, be formed of synthetic rubber. It may, in its initial state, be formed in the manner of rings of circular or other cross-section, as shown best in FIGURE 2. It will be observed that the circumferential wall 28 of the member 25 is of sufficient extension to enclose or surround member 27, the inner end of the wall 28 being formed to further surround the inner portion 10 of the chamber element 2 and to fit between the portion 10 and the member 15. The outer surface of the circumferential wall 28 exactly fits within the inner circumferential wall 16 of the member 15.

It will further be observed that the annular end enlargement 29 of member 25 has an outer inclined end surface 50 formed and adapted to mate with the conical surface 20 of the member 15.

Referring now to the form of the invention illustrated in FIGURES 7 and 8, the fitting elements 2, 15 are, for convenience, designated by the same numerals as the substantially corresponding parts illustrated in FIGURES 1–6. Similarly, the tube 1 is designated by the same numeral. A cup-like element or cushion 100 has a bottom wall 101 apertured to permit passage therethrough of the tube 1 and a cylindrical side wall 102 of sufficient axial extension to receive therewithin the reinforcing ring or anchor back-up ring 103, the anchor ring 104 and a seal ring 105 formed of compressible material having the properties, for example, of rubber, as well as the inner end portion 10 of the fitting part 2 when the parts are assembled as illustrated in FIGURE 7.

The chamber-forming elements or the fitting elements 2 and 15 are formed so that there is a circumferential channel therebetween. The element 2 is threaded intermediate its ends so as to be secured to the threaded portion on the element 15. The offset portion 10 of the element 2 has an outer diameter less than the diameter of the threads, and the inner diameter of the member 15 is less than the diameter of the threads 17. The outer diameter of the portion 10 of the member 2 and the inner diameter of the member 15 form the circumferential channel.

The cushion member 100 of the form shown in FIGURES 7 through 12, and the cushion member 25 of the form shown in FIGURES 1 through 6 each have a circumferential outer sleeve which is adapted to be received within the circumferential channel formed between the members 2 and 15. This circumferential sleeve not only fits into the circumferential channel but in so doing it allows the portion 10 of the member 2 to penetrate within the sleeve and contact the seal element. This has particular advantage in that it prevents extrusion of the sealing element into the circumferential channel. The inner diameter of the circumferential sleeve is generally equal to the outer diameter of the portion 10 of the member 2 and the outer diameter of the sleeve is generally equal to the inner diameter of the member 15. Thus when the fitting is placed on a tube and the members 2 and 15 are screwed together the circumferential sleeve will fill, at least in part, the circumferential channel and will prevent extrusion of the seal ring into this channel. The seal ring is at all times out of contact with the member 15 and is completely contained by the cushion and the end portion 10 of the member 2.

As may perhaps be best seen in the exploded view of FIGURE 8, the cushion or sleeve 100 has an inner annular bottom wall surface 106 and an inner cylindrical wall 107. The reinforcing ring or anchor support element 103 has a cylindrical outer wall or collar 109 and an annular wall portion 108 defining a central aperture sufficient just to receive the tube 1. The anchor 104, as best seen in FIGURE 7, has its outer peripheral edge designed to fit within the cup-like arrangement of the member 103 and to be just received within the circular corner formed by the mating of the wall segments 108, 109 of the member 103.

Referring now to FIGURE 9, we illustrate a variant form of our invention in which elements corresponding to those appearing in FIGURES 7–8 are given identical numerals for easier identification. In FIGURE 9, however, a set of two anchor rings, 104a and 104b, is illustrated. The rings 104a, 104b are identical with that illustrated in FIGURES 7 and 8, it being understood that all of the anchor rings of FIGURES 7–9 correspond in planar view with that illustrated in FIGURE 3, the only difference being the absence from the rings in FIGURES 7–9 of the flange or collar 40 illustrated in FIGURES 1, 2 and 4–6.

In FIGURE 10 a flat spacer ring or washer 110 is positioned between the gripping members 104a, 104b and has an outer diameter just receivable within the collar 109 of member 103 and a central aperture, the diameter of which is such as to just permit penetration by the tube 1.

In FIGURE 11 the member 100a corresponds substantially to member 100, described above, and receives seal ring 105a, corresponding to ring 105 above described, as well as the forward portion 10 of fitting 2.

In FIGURE 12, a variant form of the invention is shown in which the anchor ring 110 is a solid ring rather than a ring having a plurality of teeth or gripping segments as described earlier. The remaining elements of the structure of FIGURE 13 have been give the same designations as FIGURE 8 as the structures are similar.

Figure 13:
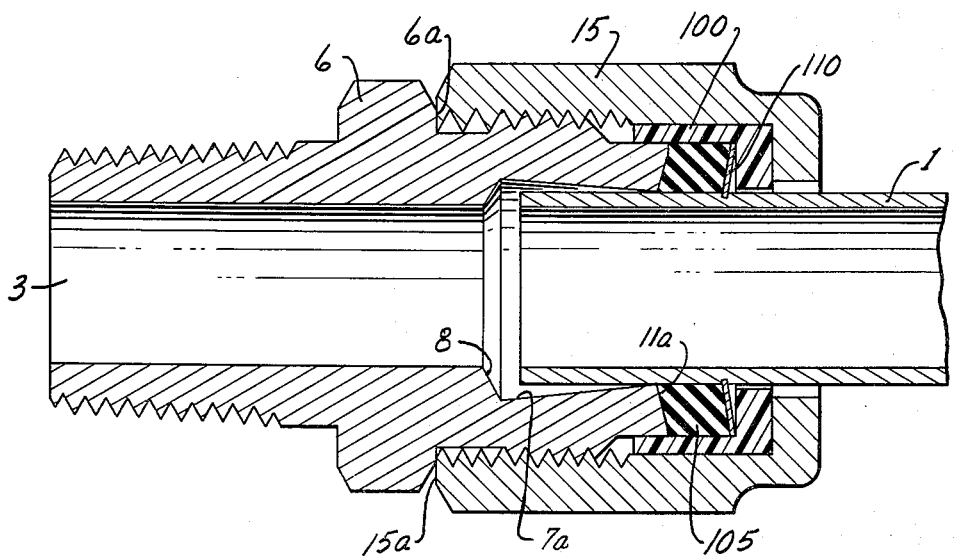
FIGURE 13 is a detail view of a further variant form of the invention.

In FIGURE 13, a further form of the invention is shown in which faces 15a and 6a of members 15 and 2 are adapted to contact each other when the proper amount of torque has been applied to tighten the fitting. Also it will be noted in this form that reinforcing ring 103 has been eliminated and the anchor ring 110 is again solid. Also, the inwardly extending flange 12 has been eliminated and instead the inner surface 7a of the member 2 has a slight taper. This taper has its widest end at the surface portion 8 and at its narrowest end it surrounds the tube with sufficient clearance to permit the tube to be inserted. As was the case in the other forms of the invention the area surrounding the end of the tube has been enlarged so as to permit oscillation and angular movement of the tube. Also the face 11a is generally conical in this form of the invention to provide an angular annular face to contact the seal element.

It will be realized that whereas we have described and claimed a practical and operative device, nevertheless many changes may be made in the size, shape, number and disposition of parts without departing from the spirit of the invention. We therefore wish our description and drawings to be taken as, in a broad sense, illustrative or diagrammatic rather than as limiting us to our precise showing.

The use and operation of the invention are as follows:

In general, when using each of the forms shown herein, the packaged seal unit including the cushion, the reinforcing member, the anchor and the seal ring is placed at the desired point along the tube. The chamber-forming elements or fitting elements are then positioned around the packaged seal unit. Although the inner diameter of the chamber-forming elements and of the elements in the package seal unit closely approximate the outer diameter of the tube, the fitting may be easily slid along the tube until the desired position is obtained. When the fitting elements are screwed together the sleeve on the cushion will extend into the circumferential channel formed between the two chamber-forming elements. This will permit one of the chamber-forming elements to penetrate into the sleeve so as to completely enclose and contain the seal ring and prevent extrusion thereof. It is important that there be no extrusion of the seal ring, therefore we have completely confined it through the use of the cushion having a circumferential sleeve, the forward portion 10, and the anchor ring. As the fitting is tightened the anchor will be forced into the surface of the tube and provide a sure tight grip for the fitting while at the same time, the seal ring will be compressed between the cushion, tube, and a portion of the chamber-forming element to form a completely leak proof joint. The fitting is tightened until the portions 15a and 6a contact each other which indicates the proper amount of torque has been applied to the fitting. It is impossible with such an arrangement to have over-torquing and distortion of the fitting parts as there can be no further movement of the fitting elements once the portions 15a and 6a are in contact. The operation and use of each of the forms shown herein is described below.

The elements 25, 13, 26, 27 are set at the desired point along the tube 1. Since elements 25 and 26, in their free state, have an inner diameter greater than the outer diameter of tube 1, and although ring 27 may have an inner diameter such as to provide an initial slightly snug fit on the tube 1, it is a simple matter for the operator to place the anchorage at the desired point. The tube-gripping member 26 is placed at substantially the point at which it is desired that the tube be gripped. The member 25, slidably mounted on the tube 1, is in position in contact with member 26, the portion 40 of the member 26 seating within the groove 30 of the member 25.

The members 25, 13, 26 and 27 may be initially mated and then mounted on the tube 1 as a unit. Thus is provided an advantage in handling, packaging and shipping of the anchorages as units. The snug fit of the member 27 with the wall 28 retains the ring 26 and, when used, member 13 or 13a, within member 25, thus producing a packaged seal and anchoring unit. The member 27 seats in position between the tube 1 and the inner circumferential surface of the wall 28 on the member 25. The nut 15 is then moved against the member 25 and about the exterior thereof. The nut 15 and member 2 are then screw-fitted together until the joint or connection has been subjected to the desired compression. No special tool or forming device is necessary. As indicated, the anchorage is initially freely slidable along the tube 1 and the user can thus easily set the joint connection at the desired point in relation to the end of the tube 1.

It will be understood that the surface 32 of cushion 25 backs up the ring 26 and prevents undue distortion thereof. Similarly, the surface 32 is effective to permit maximum depth of penetration into the tube of the segments or teeth 42. When the member 25 is of metal, the reinforcing member 13 may not be required. The member 13, however, when member 25 is of nylon or plastic, serves to back up gripping member 26 and to strengthen and protect member 25 and particularly surface 32 thereof. The member 13a may be employed whatever the material of member 25 and with or without member 13 and serves to set ring 26 as well as aid in preventing extrusion of member 27.

The joint will resist pressures of the order of 8,000 pounds or more per square inch, depending upon the diameter of tube 1. The washer or seal-and-compression member 27 spaces the tube inwardly and aids in preventing any metal-to-metal contact. The conic surface 33 of the member 25 and the relatively large diameter of the opening 19 in the nut 15, as well as the similarly sized diameter of the bore 7 and flange 12 permit an acceptable amount of angular displacement of the tube 1, with relation to the axis of the members 2, 15, without metal-to-metal contact.

As the elements 2, 15 are screw-fitted together, the member 27 is, as a result, compressed between the end surface 11 of the member 2 and the gripping member 26. The gripping segments 42 are forced into and penetrate the metal of the tube 1 as shown in FIGURE 1.

The seating of the portion 40 of the gripping member 26 in the groove 30 serves to hold the ring 26 in the desired position. The surface 32 of the enlargement 29 and ring 13, when employed, serve to preclude overcompression or excess distortion of the segments or teeth 42 and as a stop or limit to the deflection of the conical portion 41 of the member 26. The positioning of the member 27 within the wall 28 of the housing member 25 and between the member 26 and the surface 11 of the member 2 serves to prevent the material of the member 27 from being extruded along the surface of the tube 1 or in any direction while at the same time insuring that the member 27 serves to bridge and seal the space between the tube 1 and the wall 28. Similarly, the positioning of the member 27 within the wall 28 precludes distortion and extrusion of the compressible material of the member 27, the pressure within chamber 7 serving to prevent extrusion of member 27 between flange 12 and tube 1.

The use and operation of the device illustrated in FIGURES 7 and 8 is substantially that as set forth above. The seal unit comprising the elements 100, 103, 104 and 105 are received in package form, with the seal ring 105 being substantially entirely contained within the cushion 100. The entire unit is slidably mounted upon the tube 1 and the fittings 2, 15 are brought together from opposite sides of the package seal unit of the invention, the forward end 10 of the fitting 2 forcing the seal ring 105 inwardly into the cushion and being itself received within the outer portion of the cylindrical wall 102 of the member 100, to force the ring 104 inwardly as illustrated in FIGURE 7. The collar or cylindrical wall portion 109 of the member 103 serves to back up the outer peripheral edge of the member 104 and to insure, thereby, penetration of the inner or biting, segmented edge of the member 104 into the outer surface of the tube 1. With respect to the device of FIGURE 9, we find that the employment of a set of anchor rings 104a, 104b within the reinforcing ring 103 is effective to produce an ability of the seal unit to withstand greatly increased pressures far beyond what may be expected solely from the employment of a dual set of rings 104. Similarly, we find that the rings 104a, 104b are effective to produce the greatly increased capacity for withstanding higher pressures irrespective of whether openings or slots 43, such as are illustrated in FIGURE 3 of the individual rings 104a, 104b are offset one from the other or aligned one with the other. It should be noted, however, in this regard, that the likelihood of the slots of the two rings being aligned is remote since the lands between the slots constitute a much greater area. Thus, with the slots 43 out of alignment, the material of the seal ring 105 is prevented from being squeezed or extruded therethrough. In FIGURE 10 a washer ring is interposed between the rings 104a, 104b to serve the dual function of insuring proper deformation of and reinforcing members 104a, 104b and to mark the slots of member 104b to insure against such extrusion.

In FIGURE 11 we illustrate a packaged seal unit for use in installations not subjected to high pressures and not requiring an anchoring engagement with the tube 1. The cushion 100a receives the seal ring 105a under compression when fittings 2 and 15 are moved together and serves to cushion and protect the seal 105a from extrusion and contact with the teeth of member 2 and 15 and rear annular apertured wall of member 15, the only contact being that of portion of element 2 which is also received in member 100a.

In FIGURE 12, we illustrate a device substantially similar to that shown in FIGURES 7 and 8 except that the ring 110 is solid rather than segmented as the ring 104. The operation is similar to that described above in that the seal unit comprising the elements 100, 103, 110 and 105 are received in package form, with the seal ring 105 being substantially contained in the cushion 100. The unit is mounted on the tube and the opposite fitting members 2 and 15 are brought together so that the terminal portion 10 of the fitting member 2 forces the seal ring 105 inwardly into the cushion and being itself received within the outer portion of the cylindrical wall 102 of the cushion. This in turn forces the ring 110 into the tube as illustrated in FIGURE 7. By using a solid grip ring, there is no possibility of extrusion of the seal ring between the teeth as there is in the segmented ring.

In FIGURE 13 we show a solid anchor and we have eliminated the reinforcing ring. Without the reinforcing ring 103 there is an annular space around the outer diameter of the anchor which provides space for the anchor to expand. When the anchor is flattened during tightening the outer diameter will increase as it bites into the tube. There is a strong bite into the tube in this fitting as the force of the anchor flattening and expanding drives it into the tube. An additional advantage of a solid anchor ring is that there is no room for extrusion of the seal ring between the teeth. There is complete confinement of the rubber as the slight expansion of the outer diameter of the anchor fills up the annular space between the anchor and the cushion and removes the possibility of extrusion around the outside of the anchor. Also once the fitting is tightened the anchor will be completely confined.

In this form of the invention the inwardly directed flange 12 has been eliminated and instead the inner surface 7a of the member 2 is tapered with the widest end being at the end of the tube. This taper takes place of the enlarged portion defined by wall 7 in the other forms of the invention and permits angular movement of the tube within the fitting.

After a fitting such as shown herein is placed under heat, pressure and vibration, and then is allowed to cool, some of the volume of the sealing element may be lost. This in turn will cause the fitting to leak. This is especially true when the ring is segmented, as with a solid ring the seal member can't extrude between the teeth and after cooling there will be no lost volume.

It should be realized that various features of each of these different forms may be combined depending upon the particular application of the fitting. For example, a fitting might combine the cushion 100, reinforcing ring 103, anchor 110 and seal 105 of FIGURE 12 with fitting elements 6 and 15 of FIGURE 13. In other words, the elements shown in FIGURE 12 could be combined with the fitting elements 6 and 15 of FIGURE 13 so that a fitting would be provided which prevents overtorquing and hence distortion of the seal element and in addition provides a chamber having tapered side walls to permit angular movement and oscillation of the tube. Additionally, there may be other modifications and changes of the particular elements or members used in the fittings to give a combination which is particularly suitable for a specified use.

We claim:

In a pressure joint, a tube, a pressure housing for receiving and surrounding said tube, said housing including a plurality of relatively movable chamber elements, one of said elements having a cylindrical portion and an end wall having an aperture through which the end of the tube extends, an anchorage on said tube including a deformable substantially conical gripping ring having its inner edge positioned for substantially continuous contact with the tube, a relatively non-distortable cushion member of nylon or the like having an annular end wall and a circumferential wall surrounding and confining the outer edge of said gripping ring, the outer diameter of said circumferential wall being generally equal to the inner diameter of said cylindrical portion of the one of said elements, a rigid reinforcing ring positioned between said gripping ring and cushion and seated against said cushion annular end wall, said reinforcing ring having a circumferential flange positioned against said cushion circumferential wall and confining the outer edge of said gripping ring, and means for providing a seal between said tube and said housing including a body of resilient rubber-like relatively distortable material surrounding said tube between said tube and the inner surface of said circumferential wall, said flexible body having an outer diameter generally equal to the inner diameter of said circumferential wall and an inner diameter generally equal to the outer diameter of said tube, said flexible body being positioned entirely within said circumferential wall, said cushion member having an end portion formed and adapted to be contacted by one of said chamber elements, the other of said chamber forming elements including an offset end portion adapted to penetrate said cushion and be positioned within said circumferential wall and in contact with said flexible body, said offset end portion having an outer diameter generally equal to the inner diameter of said circumferential wall of said cushion member and an annular end wall positioned for contact with said flexible body, the inner diameter of said offset end portion annular wall being slightly greater than the outer diameter of said tube, said offset end portion being on the interior of said pressure joint, said flexible body being contained between said offset end portion, circumferential wall, gripping ring and the tube to be sealed, said chamber forming elements being adapted to subject the seal and cushion member to compression sufficient to substantially flatten said gripping ring and to force said gripping ring to bite into the tube, the gripping ring, reinforcing ring and the cushion member annular end wall preventing extrusion of said seal axially along said tube.

References Cited in the file of this patent

UNITED STATES PATENTS

| 493,883 | Ballet | Mar. 21, 1893 |
| 770,525 | Hussey | Jan. 4, 1904 |
| 2,448,888 | Hynes | Sept. 7, 1948 |
| 2,547,394 | Hynes | Apr. 3, 1951 |
| 2,672,187 | Smith | Mar. 16, 1954 |
| 2,837,351 | Bailey | June 3, 1958 |

FOREIGN PATENTS

| 551,006 | Great Britain | Feb. 3, 1943 |